United States Patent
Yuan (10) Patent No.: US 6,785,828 B2
(45) Date of Patent: *Aug. 31, 2004

(54) APPARATUS AND METHOD FOR A LOW POWER, MULTI-LEVEL GTL I/O BUFFER WITH FAST RESTORATION OF STATIC BIAS

(75) Inventor: Xiaolin Yuan, Davis, CA (US)

(73) Assignee: Intel Corporation, Santa Clara, CA (US)

( * ) Notice: Subject to any disclaimer, the term of this patent is extended or adjusted under 35 U.S.C. 154(b) by 534 days.

This patent is subject to a terminal disclaimer.

(21) Appl. No.: 09/747,618

(22) Filed: Dec. 20, 2000

(65) Prior Publication Data

US 2002/0078389 A1 Jun. 20, 2002

(51) Int. Cl.[7] .................. G06F 1/26; H03K 19/0175
(52) U.S. Cl. .......................................... 713/300; 326/83
(58) Field of Search ................................. 713/300, 320; 326/81, 86, 83, 87; 361/111

(56) References Cited

U.S. PATENT DOCUMENTS

| | | | | |
|---|---|---|---|---|
| 5,023,488 A | * | 6/1991 | Gunning ...................... | 326/86 |
| 5,359,243 A | * | 10/1994 | Norman ...................... | 326/65 |
| 5,534,811 A | | 7/1996 | Gist et al. | |
| 5,576,635 A | | 11/1996 | Partovi et al. | |
| 5,635,861 A | * | 6/1997 | Chan et al. .................... | 326/81 |
| 5,771,389 A | * | 6/1998 | Swartz ........................ | 713/300 |
| 5,914,844 A | * | 6/1999 | Lutley et al. ................ | 361/111 |
| 6,111,449 A | * | 8/2000 | Tobita ......................... | 327/327 |
| 6,181,193 B1 | * | 1/2001 | Coughlin, Jr. ............... | 327/534 |
| 6,208,178 B1 | * | 3/2001 | Chen ........................... | 327/108 |
| 6,218,863 B1 | * | 4/2001 | Hsu et al. .................... | 326/87 |
| 6,265,926 B1 | * | 7/2001 | Wong .......................... | 327/318 |
| 6,288,962 B1 | | 9/2001 | Nagaoka | |
| 6,313,661 B1 | * | 11/2001 | Hsu ............................. | 326/81 |
| 6,353,333 B1 | * | 3/2002 | Curd et al. ................... | 326/81 |
| 6,353,524 B1 | * | 3/2002 | Sloan .......................... | 361/111 |
| 6,400,546 B1 | * | 6/2002 | Drapkin et al. ............. | 361/111 |
| 6,426,854 B1 | * | 7/2002 | Allen .......................... | 361/56 |
| 6,496,054 B1 | * | 12/2002 | Prather et al. .............. | 327/534 |
| 2002/0101265 A1 | | 8/2002 | Yuan | |

OTHER PUBLICATIONS

Ikeda et al., "0.5um 1M Gate CMOS SOG", IEEE 1993 Custom Integrated Circuits Conference. 1993, pp 23.2.1–23.2.4.*

* cited by examiner

Primary Examiner—Thomas Lee
Assistant Examiner—Chun Cao
(74) Attorney, Agent, or Firm—Blakely, Sokoloff, Taylor & Zafman LLP (57) ABSTRACT

A method and apparatus for a low power, multi-level GTL interface signaling FSB buffer with fast restoration of static bias are described. The buffer includes a dynamic bias circuit to clamp a pad voltage level to a termination voltage level Vtt in response to a rising signal transition at the pad. By pulling-down a node voltage from a static voltage level to a dynamic voltage level, the pad voltage level is prevented from overshooting Vtt. A static bias circuit is used to maintain the node voltage at the static voltage level. A dynamic resistance unit aids the static bias circuit in restoring the node voltage level to the static voltage level once the rising signal transition is complete. Consequently, a duration of the clamping of the pad voltage level is minimized and power for clamping the pad voltage level to Vtt is reduced.

36 Claims, 6 Drawing Sheets

APPARATUS AND METHOD FOR A LOW POWER, MULTI-LEVEL GTL I/O BUFFER WITH FAST RESTORATION OF STATIC BIAS

FIELD OF THE INVENTION

The present invention relates generally to power consumption during I/O buffer clamping. In particular, the present invention relates to an apparatus and method for a low power multi-level GTL I/O buffer with fast restoration of static bias.

BACKGROUND OF THE INVENTION

The reduction of current and power consumption have become increasingly important in modern PC (personal computer) system designs, including, for example, the design of mobile computers, laptop computers, etc. Reduction of power consumption provides the direct benefit of increasing battery lifetime, which is vital for mobile or laptop computers. Unfortunately, due to the size of the various I/O (input/output) buffers utilized in modern PC systems, the interfacing signals between the various I/O buffers are subject to overshoot or undershoot when transitioning from zero to one or one to zero, respectively. In order to solve this problem, state of the art chipset I/O buffer circuits are designed with a P-clamp transistor and an N-clamp transistor to reduce overshoot and undershoot when interfaced with a CPU (central processing unit) I/O buffer circuit. The P-clamp transistor is used for preventing pad voltage overshoot, and the N-clamp transistor is used for preventing pad voltage undershoot.

These I/O buffer circuits normally include static and dynamic components. During a rising transition period from zero to one, the dynamic components pull down a P-bias node voltage from a static level (static mode) to a dynamic level (dynamic mode) and turn-on the P-clamp transistor. Once turned on, the P-clamp circuit conducts to generate a clamping current from a GTL (gunning transistor logic) buffer, external termination voltage (Vtt) supply to the I/O buffer ground (IOVSS) through an I/O buffer pad. The clamping current generated by the P-clamp is in the magnitude of milli-amperes (mA) range and is used to provide overshoot protection. For example, referring to FIG. 1, a rising transition from a zero to a one is depicted at the I/O buffer pad. When a voltage overshoot 104 at the pad is detected, the pad is clamped down to the Vtt level 106 for an overshoot event greater than the Vtt voltage level 106. However, once the transition is over, the P-bias node voltage must return to the static voltage level immediately and turn-off P-clamp circuit.

The static voltage level is normally designed with a P-clamp voltage between state and source (VGS) at about 50 milli-volts (mV), which is much less than a threshold voltage (Vtp) (0.4–0.5 volts) of the P-clamp transistor. As a result, the P-clamp transistor is in a cutoff region and only nano amperes of the leakage current flow through the P-clamp transistor during static mode. However, if the return or restoration of the P-clamp transistor, from dynamic mode to static mode, is not fast enough, then a considerable amount of extra current in the range of milliamperes will be unnecessarily consumed. This results in large power consumption and consequently drains the system battery quickly.

Referring again to FIG. 1, the time in which clamping of the pad voltage level to the Vtt voltage level 106 is indicated as $\tau_{on}$ 112. $\tau_{on}$ refers to the duration of time during which the P-clamp transistor is activated 108 until the time the P-clamp transistor is deactivated 110. Unfortunately, during this $\tau_{on}$ 112 period, the P-clamp circuit is using up power by generating a clamping current as described above. Ideally, after the rising transition period $\tau_{on}$ 112 is over, the P-bias node voltage level returns to the static voltage level as quickly as possible to ensure that the P-clamp circuit consumes the least amount of current from Vtt external voltage supply. Although the amount of voltage from Vtt external voltage supply during this $\tau_{on}$ period appears to be negligible, modern PC systems may include hundreds of I/O buffers, each requiring clamping of the pad voltage levels. As the amount of I/O buffers increases, the amount of current, and hence the amount of battery loss, is greatly increased.

Therefore, there remains a need to overcome one or more of the limitations in the above-described existing art.

BRIEF DESCRIPTION OF THE DRAWINGS

The features, aspects, and advantages of the present invention will become more fully apparent from the following detailed description and appended claims when taken in conjunction with accompanying drawings in which:

DETAILED DESCRIPTION OF THE INVENTION

An apparatus and method for a low power, multi-level GLT interface signaling I/O buffer with fast restoration of static bias are described. In the following description, numerous specific details are set forth in order to provide a thorough understanding of the present invention. It will be apparent, however, to one skilled in the art that the present invention may be practiced without some of these specific details. For example, various signals, layout patterns, and logic circuits may be modified according to the teachings of the present invention. The following description provides examples, and the accompanying drawings show various examples for the purposes of illustration. However, these examples should not be construed in a limiting sense as they are merely intended to provide examples of the present invention rather than to provide an exhaustive list of all possible implementations of the present invention. In other instances, well-known structures, and devices are shown in block diagram form in order to avoid obscuring the present invention.

Figure 2:
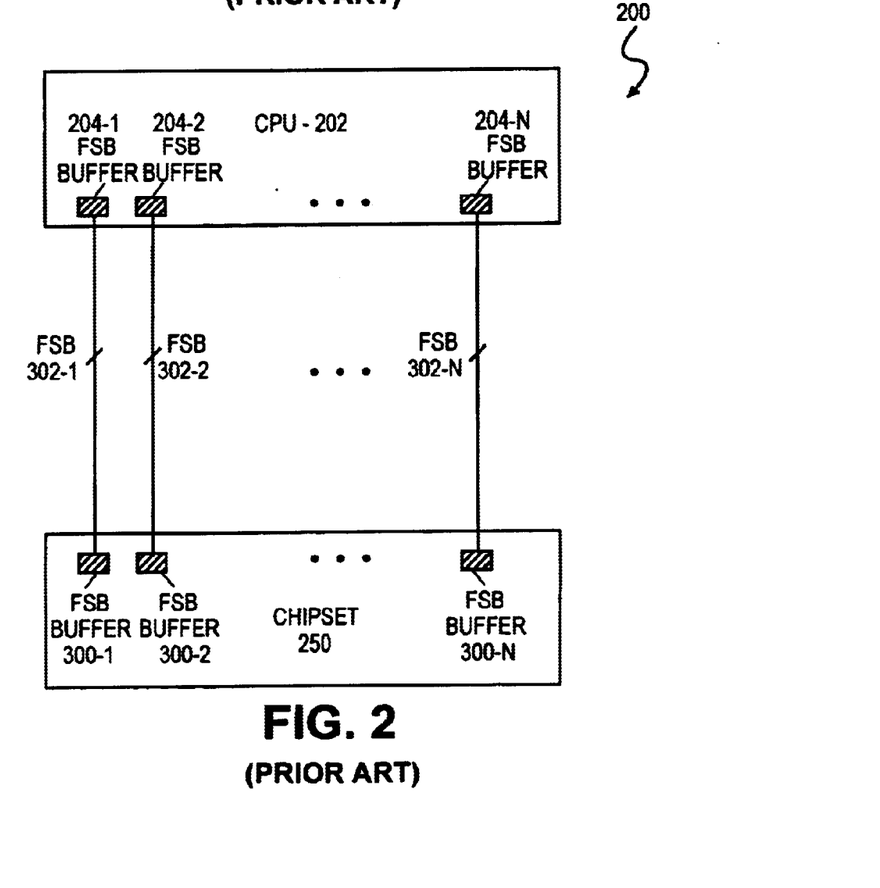
FIG. 2 is a block diagram illustrating a computer system including a CPU coupled to a chipset by one or more front side buses (FSB), as known in the art.

Referring now to FIG. 2, a block diagram of a computer system 200 is depicted. The computer system 200 includes a CPU 202 having a plurality of front side bus (FSB) buffers 204 (204-1, 204-2, . . . , 204-N). The computer system 200 also includes a chipset 250 having a plurality of front side buses 300 (300-1, 300-2, . . . , 300-N). The CPU 202 buffers 204 are coupled to the chipset buffers 300 (FSB) via a plurality of front side buses 302 (302-1, 302-2, . . . , 302-N). The chipset 250 is, for example, a graphics memory controller hub (GMCH) and can include as many as 130 FSB buffers 300. Accordingly, current consumed while preventing pad voltage overshoot, as described above, is exacerbated by the vast number of FSB buffers 300.

Figure 3:
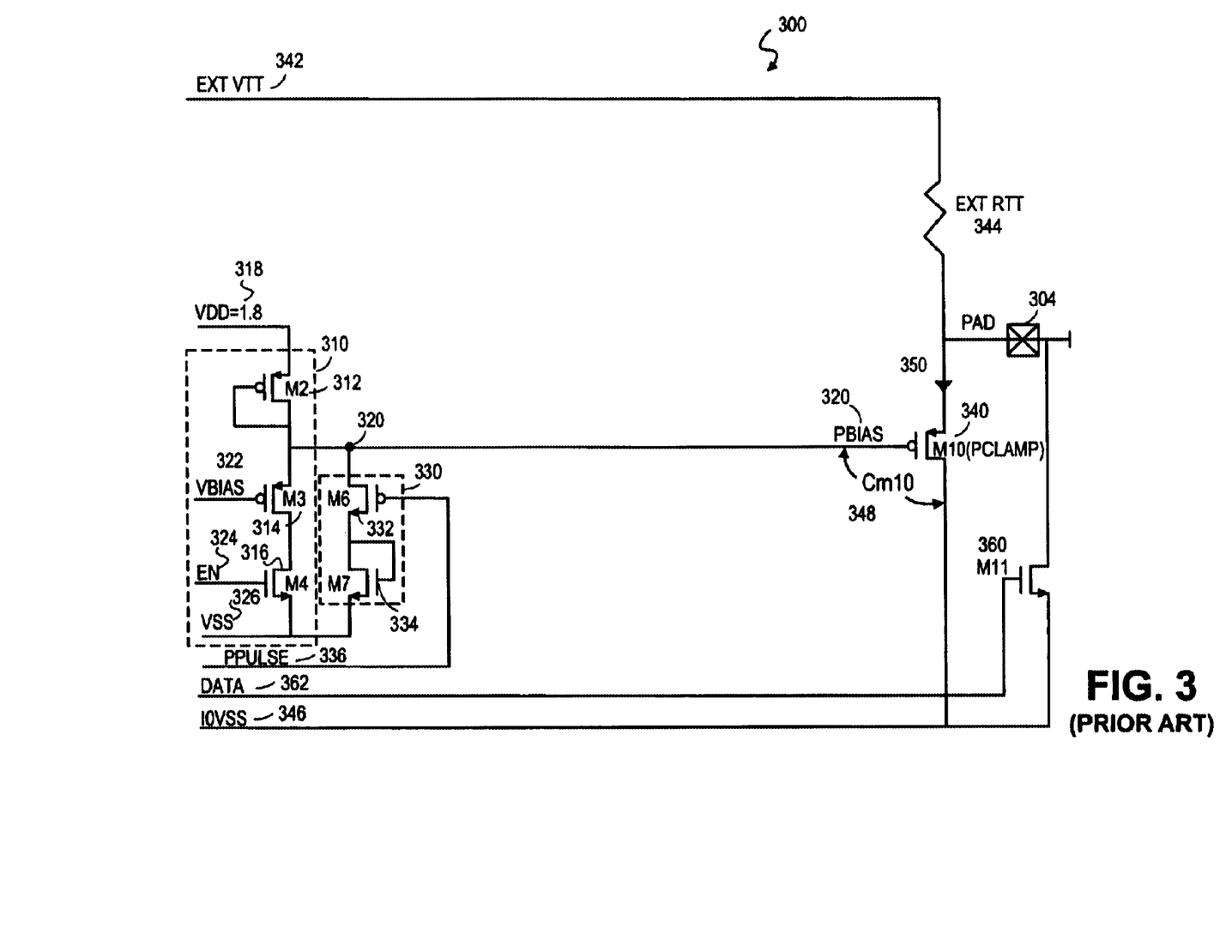
FIG. 3 illustrates an I/O buffer designed to prevent pat voltage overshoot, as known in the art.

Referring now to FIG. 3, a conventional FSB I/O buffer 300, as utilized by the chipset 250, is depicted. The I/O buffer 300 utilizes P-clamp static and dynamic bias techniques, when an I/O buffer pad 302 encounters a rising transition from a logical zero to a logical one, in order to prevent pad voltage overshoot. The I/O buffer 300 utilizes a static bias circuit 310 as well as a dynamic bias circuit 330 in order to manipulate a node voltage of a P-bias (PBIAS) node 320. The static bias circuit 310 maintains a node voltage of the PBIAS node 320 at 1.45 volts (static voltage level) when a termination voltage (Vtt) equals 1.5 volts. The dynamic bias circuit 330 is enabled by a pulse signal (PPULSE) 336. When enabled, the dynamic bias circuit 330 drops the node voltage level of the PBIAS node 320 to about 0.8 volts (dynamic voltage level). Dropping the PBIAS node 320 voltage level to the dynamic voltage level turns on a P-clamp transistor 340. Once turned on, the P-clamp transistor 340 conducts and causes a clamping current 350 from an external termination voltage supply (EXT VTT) 342 through an external resistor (Ext Rtt) 344 and through an I/O buffer ground (IOVSS) 346. This clamping current 350 clamps a voltage level of the pad 304 to the termination voltage level Vtt if the pad 304 voltage level overshoots Vtt.

The PPULSE signal 336 is generated in response to the detection of a rising signal transition from zero to one at the buffer pad 304, which we will refer to as dynamic mode. The duration of the PPULSE signal 336 is for example, less than 1.5 nanoseconds. Consequently, the dynamic bias circuit is active during dynamic mode for less than 1.5 ns. As soon as the PPULSE signal 336 is over, the dynamic bias circuit 330 is turned off and the node voltage of the PBIAS node 320 is restored to the static voltage level of 1.5 volts. Once the PBIAS node 320 node voltage returns to the static voltage level of 1.5 volts, the P-clamp transistor 340 is turned off so that extra current, which is caused by the conduction of the P-clamp transistor 340, is very minimal and negligible. Consequently, after the dynamic period or rising signal transition period is over, the voltage level of the PBIAS node 320 desirably returns to the static voltage level of 1.45 volts as quickly as possible so that the P-clamp transistor 340 consumes the least amount of current from the EXT VTT voltage supply 342.

The static bias circuit 310 includes a first transistor 312 having a source coupled to a part core power supply (VDD) of 1.8 volts. The first (M2) transistor 312 also contains a gate and a drain coupled to the PBIAS node 320, such that the M2 transistor 312 is connected in diode fashion. The static bias circuit 310 further includes a second transistor having a source coupled to the PBIAS node 320 and a gate that receives a bias (VBIAS) signal 322. A third (M4) transistor 316 includes a drain coupled to the drain of the M3 transistor, a gate receiving an enable (EN) signal 324 and a source coupled to an internal buffer ground (VSS) 326. The M3 transistor 322 is biased in a saturation region in response to the VBIAS signal 322 in order to maintain a constant current through the M2 transistor 312, which is connected in a diode fashion. The M4 transistor 326 is used for enabling the static bias circuit 310 and functions as a switch in response to the EN signal 324.

The dynamic bias circuit 330 includes a first dynamic (M6) transistor 352 having a source coupled to the PBIAS node 320, and a gate receiving the PPULSE signal 336. A second dynamic (M7) transistor 334 includes a drain and a gate coupled to the drain of the M6 transistor 332. The M7 transistor 334 also includes a source coupled to the VSS ground 326. The M7 transistor 334 is connected in a diode fashion, such that when the M6 transistor, which functions as a switch, is turned on in response to the PPULSE signal 336, the node voltage of the PBIAS node 320 will be discharged through the M6 and M7 transistors 332 and 334. As such, the dynamic bias circuit 330 is enabled by the PPULSE signal 336 in order to drop the PBIAS node 320 node voltage from the static voltage level to the dynamic voltage level. In other words, once the M6 transistor 332 is switched on by the PPULSE signal 336, the node voltage of the PBIAS node 320 is clamped by the M7 transistor to the dynamic voltage level of 0.8 volts.

Careful review of the FSB buffer 300 illustrates that the goal in designing efficient overshoot protection is to expedite restoration of the PBIAS node 320 from the dynamic voltage level to the static voltage level. Otherwise, a considerable amount of extra current, in the range of milliamperes is unnecessarily consumed by the M10 P-clamp transistor 340. As the number of I/O buffers used in a computer system increases, this extra current can result in a large amount of power consumption and consequently drain the system battery in the computer systems 200, as depicted in FIG. 2.

However, to meet very large-scale integration (VLSI) demand for faster speed and higher density circuit, the CMOS (complementary metal-oxide semiconductor) scaling rule, as known in the art, continually results in the decreasing of the thickness of the CMOS gate oxide. As the thickness of the CMOS gate oxide decreases, circuits run the risk of high voltage gate oxidation breakdown. To ease high voltage gate oxide breakdown, the trend of gunning transistor logic (GTL) is toward low voltage GTL interface signaling of 1.2 volts (LVGTL) from the current 1.5 volt GTL interface signaling.

Figure 4:
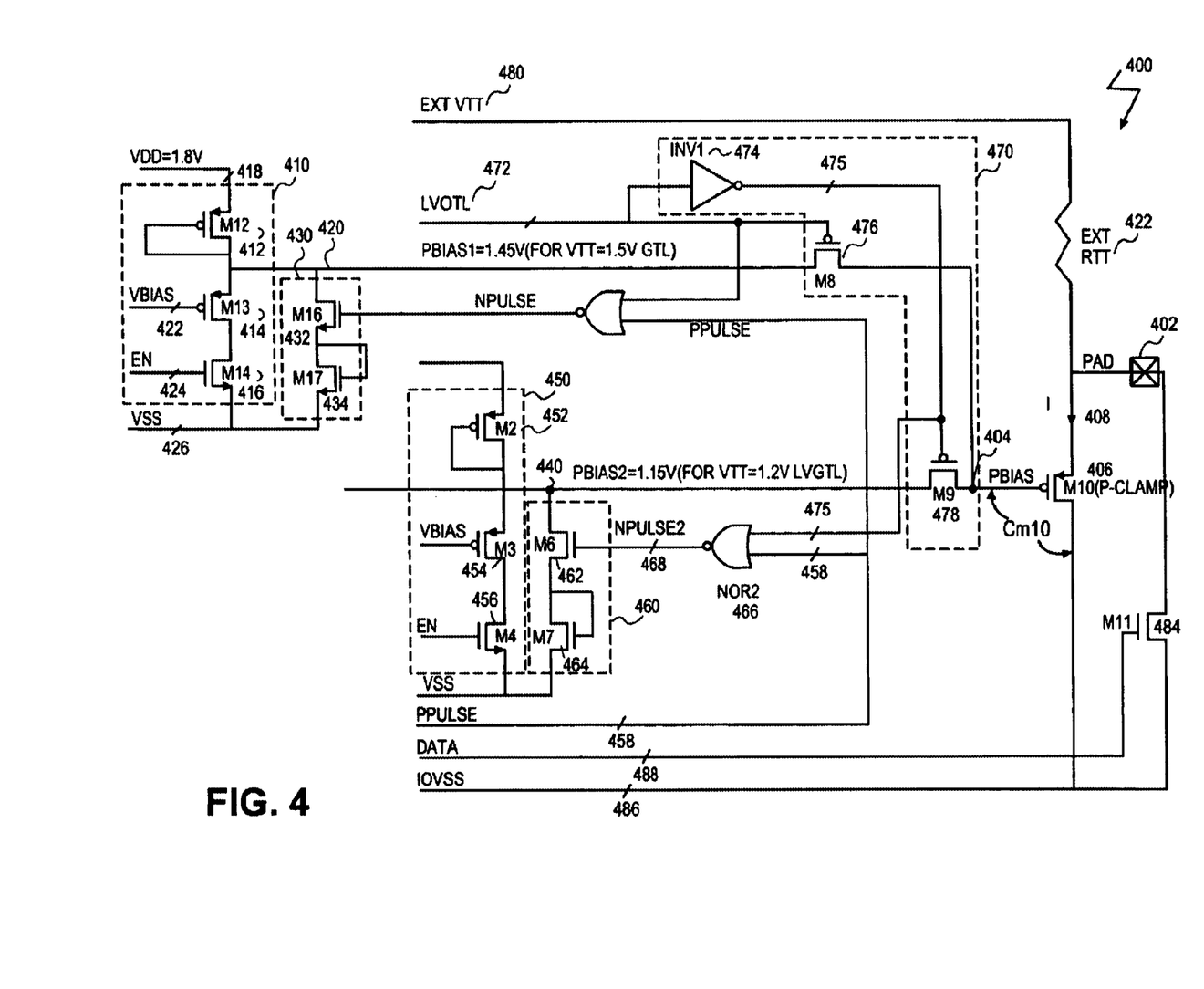
FIG. 4 depicts a dual mode I/O buffer designed to prevent pad voltage overshoot in accordance with an embodiment of the present invention.

Referring now to FIG. 4, a dual mode GTL interface signaling FSB buffer 400 is depicted in accordance with an embodiment of the present invention. The buffer 400 is designed to accommodate LVGTL interface signals of 1.2 volts, as well as the normal GTL interface signals voltage of 1.5 volts. As described with reference to FIG. 3, the buffer 400 utilizes static and dynamic bias techniques in order to prevent rising signal transition overshoot at pad 402. The buffer 400 includes a first static bias circuit 410 and a first dynamic bias circuit 430. A static bias circuit 410 maintains a first bias (PBIAS1) node 420 at a static voltage of 1.45 volts. A dynamic circuit 430 dynamically drops a node voltage level of the PBIAS1 node 420 from the static voltage level to a dynamic voltage level of 0.08 volts in order to support GTL interface signaling.

The buffer 400 further includes a second static bias circuit 450 and a second dynamic bias circuit 460. The static bias circuit 450 maintains a voltage level of a second bias (PBIAS2) node 440 at a static voltage level of 1.15 volts in order to implement LVGTL interface signaling. The second dynamic bias circuit 460 reduces the node voltage level of the PBIAS2 node 440 from the static voltage level to a dynamic voltage level of 0.5 volts in response to a second pulse signal (NPULSE2) 468. This chipset FSB buffer 400 is designed to work with dual GTL interface signaling. The defaults for the buffer is 1.5 volts (Vtt=1.5V) (GTL mode) and another voltage level of 1.2 volts (Vtt=1.2V) (LVGTL mode). This particular level is selected by a control signal 472, which is fed to a 2:1 input selection gate 470.

The input selection gate 470 routes either the PBIAS1 node (1.45 volts) or the PBIAS2 node (1.15 volts) to the input selection gate output PBIAS node 404. The input selection gate 470 includes, for example, a first inverter 474 that receives an a control (LVGTL) signal 472. The input selection gate 470 further includes a first pass (M8) transistor 476 having a source coupled to the PBIAS1 node 420, a gate to receive the LVGTL signal 472 and a drain coupled to the PBIAS node 404. A second pass (M9) transistor 478 includes a gate coupled to the LVGTL signal 472, a source coupled to the PBIAS2 node 440 and a drain coupled to the PBIAS node 404.

For example, in LVGTL mode, the LVGTL signal 472 is equal to one, so the M9 pass transistor 478 is turned on, resulting in the PBIAS2 node 440 functioning as the PBIAS node 404 in order to implement LVGTL interface signaling. In GTL mode, the LVGTL signal is equal to zero so the M8 pass transistor 476 is on and the M9 pass transistor 478 is off. As a result, the PBIAS1 node 420 functions as the PBIAS node 404 with a static voltage level of 1.45 volts in order to implement GTL interface signaling.

Unfortunately, when the termination voltage Vtt drops from 1.5 volts to 1.2 volts in LVGTL mode, the PBIAS node 404 requires adjustment of both the static and dynamic levels in order to accommodate the lower termination voltage Vtt of 1.2V. Otherwise, correct clamping of the pad 402 voltage level in order to prevent overshoot is not accomplished. In other words, LVGTL mode results in a much larger RC (resistor-capacitor) time constant (of the CM10 P-clamp 406) for charging the PBIAS node 404 from its dynamic voltage level (0.5V) to its static voltage level (1.45V). The restoration of the PBIAS node 404 from the dynamic voltage level to the static voltage level results in a lower than desired PBIAS static voltage level, which draws extra current and uses extra power from the external power supply EXT VTT 480.

Referring again to FIG. 4, the M10 P-clamp transistor 406 is designed with a gate capacitance which is normally in the range of 0.8 pico farads (PF) to approximately one pico farad (0.8 PF–1.0 PF). In addition, a larger resistance results when going from GTL mode to LVGTL mode. In order to calculate a new lowered PBIAS2 static voltage level, the following assumptions are made. Assuming the M2 transistor 452 of the static bias circuit 450 has a resistance R2, a constant static current flowing through the M2, M3 and M4 transistors is "I". As a result, the voltage at the PBIAS2 node 420 (Vpbias2) is given by the following equation:

$$Vpbias2=VDD-(I \times R2) \quad (1)$$

Rearranging Equation (1) as follows yields:

$$R2 \times I = VDD - Vpbias2 \quad (2)$$

Since VDD remains the same when going from GTL mode to LVGTL mode, while Vpbias2 becomes smaller, going from 1.5 volts to 1.15 volts, the left side of equation (2) is increased. However, since we do not want to increase the static current I due to our goal of a low power design, the best choice left is to increase R2 (M2 transistor 452 resistance). As a result, this increased resistance version of R2 is now referred to, or renamed as R2', and in LVGTL is greater than in GTL mode or $$R2'(LVGTL) \text{ is} > R2(GTL) \quad (3)$$

Figure 5:
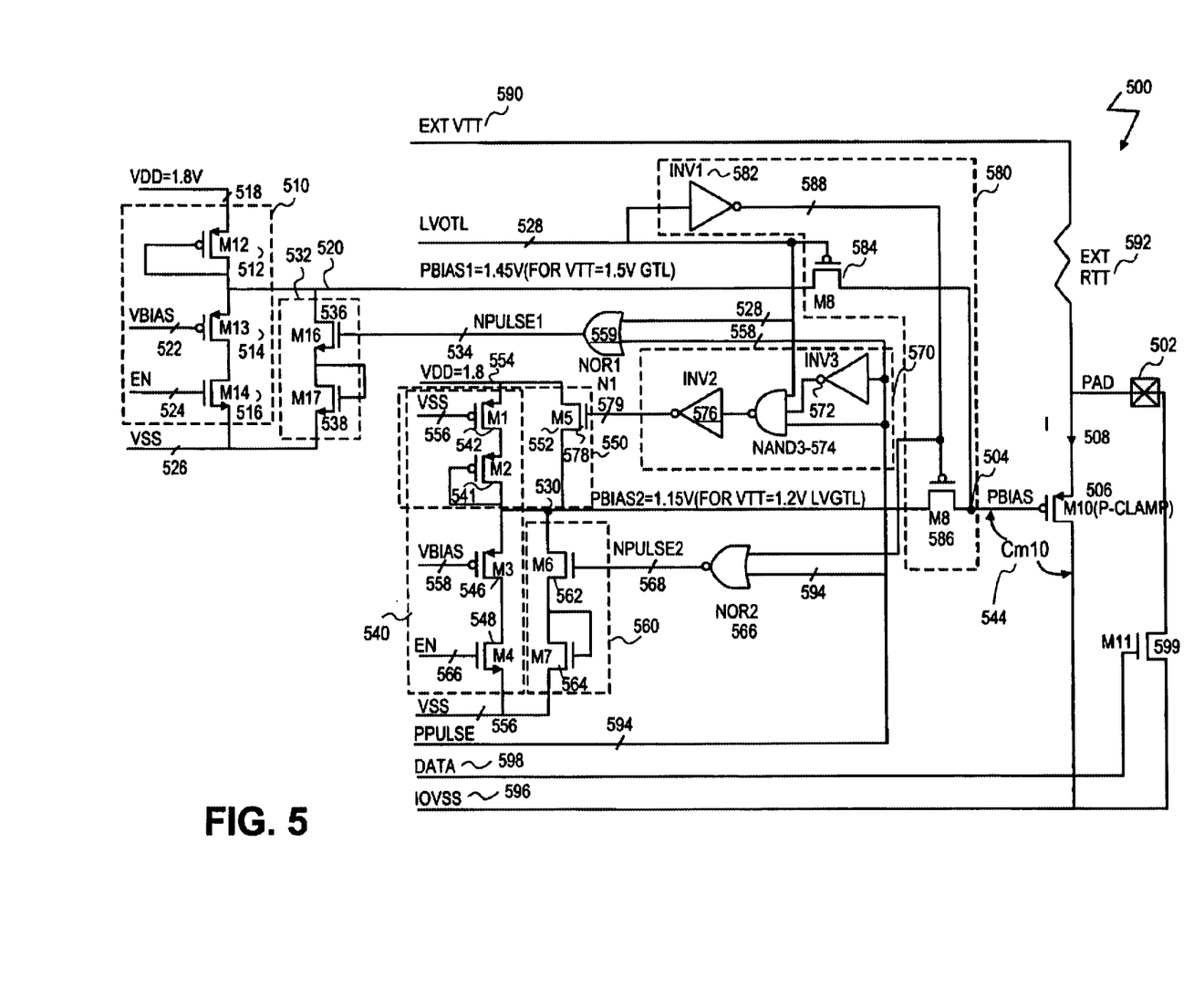
FIG. 5 depicts a dual mode I/O buffer designed to prevent pad voltage overshoot in accordance with an exemplary embodiment of the present invention.

In addition, as depicted in FIG. 5, an extra or M1 transistor 542, can be added to the static bias circuit 550. The addition of the M1 transistor 552 can be used to fine tune the R2 resistance to achieve a static voltage level of 1.15V at the PBIAS2 node 530. Assuming the on-resistance of the M1 transistor 552 is R1, then the combined resistance from VDD 544 to the PBIAS2 node is R static where:

$$R_{static} = R2' + R1 \quad (4)$$

and from Equations (3) and (4):

$$R_{static} >> R2 \quad (5)$$

The RC time constant in GTL mode (to the first order) is:

$$\tau_{GTL} = R2 \times CM10 \text{(capacitance of M10 P-clamp 406)} \quad (6)$$

The RC time constant in the case of LVGTL mode to the first order is:

$$\tau_{LVGTL} = R_{static} \times CM10 \quad (7)$$

and from Equations (5) and (6), we get:

$$\tau_{static} = \tau_{LVGTL} >> \tau_{GTL} \quad (8)$$

In other words, the new RC time constant required to charge the PBIAS node 530 from the dynamic voltage level to the static voltage level is now given by $\tau_{static}$ in LVGTL mode, which is larger than $\tau_{GTL}$ from before. As a result, in LVGTL mode, and during the dynamic mode, Vpbias2 can drop down to 0.5 volts from the static level of 1.15 volts. When the PPULSE signal 594 is over, Vpbias2 will be restored from its dynamic voltage level of 0.5 volts and charge it back to its static voltage level of 1.15 volts, which will turn off the M10 P-clamp transistor 506. Due to the larger RC time constant ($\tau_{static}$, as given above), the restoration process of the PBIAS node 504 is slower.

Figure 7:
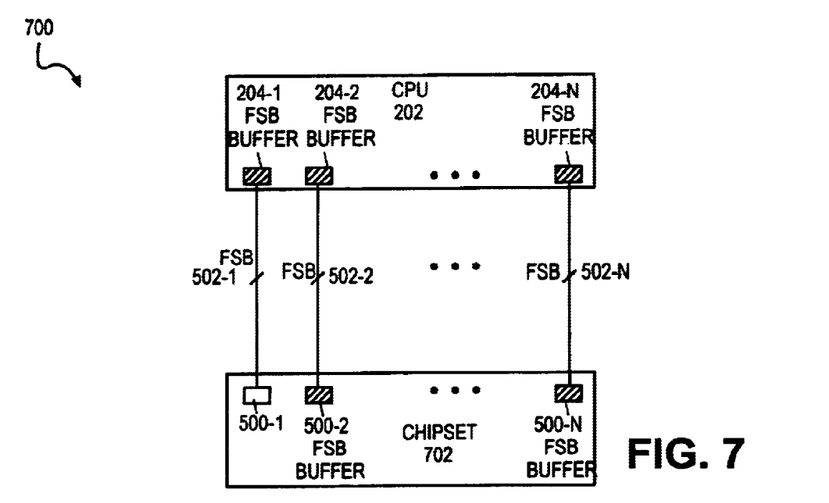
FIG. 7 is a block diagram illustrating a computer system including a chipset utilizing I/O buffers in accordance with the teachings of the present invention.

Consequently, the amount of time required for Vpbias2 to reach the Vtt level (restoration time) in LVGTL mode is greater than the restoration time in GTL mode. During this long restoration time, the P-clamp M10 506 is continuously conducting, and therefore, it continues to burn extra DC (direct current) current. Considering that the M10 P-clamp 506 is also a large device, and there can be as many as 130 of these FSB buffers 500 inside a chipset (for example, chipset 702 as depicted in FIG. 7), the total amount of lost DC (direct current) current can amount to an unwanted magnitude of current in the range of milli-amperes.

Clearly, this is not a desirable result for low power applications such as a mobile or laptop devices. Another minor problem is that the restoration time of Vpbias2, from the dynamic voltage level to the static voltage level, is limited by the clock. Depending on the clock frequency, the restoration time for returning to the static voltage level of 1.15 volts may be less than one cycle of time. In addition, the Vpbias2 voltage should return to the static voltage level from a minimum period of time before the next cycle starts. With the large time constant mentioned above, periodic return to a static level of 1.15 volts is not ensured.

Referring now to FIG. 5, a dual GTL interface signaling FSB buffer 500 for preventing pad voltage overshoot is depicted in accordance with the further embodiment of the present invention. The buffer 500 includes a dynamic bias circuit 560. The dynamic bias circuit 560 clamps a voltage level at an buffer pad 502 to the termination voltage level Vtt in response to a rising signal transition at the buffer pad 502. The dynamic bias circuit 560 pulls down the node voltage of PBIAS node 504 from a static voltage level of 1.15 volts to a dynamic voltage level of 0.5V to turn on an M10 P-clamp 506. Once turned on, the M10 P-clamp 506 prevents the I/O buffer pad 502 from overshooting the Vtt voltage level.

A static bias circuit 540 maintains a node voltage of the PBIAS node 504 at the static voltage level of 1.15 volts. A dynamic resistance unit 550 is designed to aid the static bias circuit 540 in pulling up the node voltage of the PBIAS node 504 from the dynamic voltage level to the static voltage level once the rising signal transition at the buffer pad 502 is complete. By aiding the static bias circuit 540 in pulling-up the PBIAS node voltage, the dynamic resistance circuit 550 minimizes a duration in which the M10 P-clamp transistor 506 is active (on time), and clamping of the voltage level at the buffer pad 502. By turning off the P-clamp transistor 506 as soon as possible, a clamping current 508 generated by the P-clamp that consumes energy from an external termination voltage 590 (EXT VTT) is minimized.

The dynamic resistance circuit 550 includes an M1 transistor 542 having a source coupled to a part core power supply (VDD) 554, and a gate coupled to an internal ground (VSS) 556. An M2 transistor 544 includes a source coupled to a drain of the M1 transistor 552 and a gate and a drain coupled to a second bias node (PBIAS2) node 530 in diode fashion. The dynamic resistance circuit 550 further includes an M5 transistor 552 connected in parallel with the M1 and M2 transistors (542, 544). The M5 transistor includes a drain coupled to the part core power supply (VDD) 554, a gate coupled to a resistance enable (EN) signal 578 and a source coupled to the PBIAS2 node 530. With the addition of the M5 transistor 552, and assuming R5 is the on resistance of the M5 transistor, the total resistance from VDD 554 to the PBIAS2 node 530 is a parallel resistance of R5 with Rstatic (from Equation (4)). Denoting the total resistance by R dynamic, we have:

$$R_{dynamic} = R_{static} // R5 \quad (9)$$

and we also have:

$$R_{dynamic} < R5, \text{ which is} < R_{static} \quad (10)$$

Since R5 is a very small resistance, when node (N1) 519 is at VDD, the M5 transistor is turned on and biased into a linear region. Since Rdynamic is R5 parallel with Rstatic, Rdynamic is even smaller than R5. As a result, the new time constant becomes much shorter. Consequently, during the period of time when the M5 transistor 552 is on, the dynamic RC time constant of the M10 P-clamp 506 is given by the following equation:

$$R\text{dynamic} = R\text{dynamic} \times CM10 \quad (11)$$

From Equations (7), (8), (9) and (10), we finally arrive at $$\tau_{dynamic} << \tau_{static} \quad (12)$$

However, the addition of the M5 transistor 552 can result in contention with a discharging M6 transistor 562 from a dynamic bias circuit 560. Consequently, the problem becomes how to turn on the M5 transistor for a short period of time with the charging RC time constant of Rdynamic while avoiding contention with a discharging M6 transistor

562. To avoid the contention problem, a self time pulse, falling edge detection circuit 570 is designed to detect a falling edge of the PPULSE signal 594. This detection circuit 570 eliminates M5 transistor 562 and M6 transistor 564 power contention. In other words, during the dynamic mode, PPULSE signal 594 transitions to zero in order to activate the dynamic bias circuit 560 and de-activate the dynamic resistance circuit 550.

However, as soon as the dynamic period is over, PPULSE 594 transitions from zero to one. This causes a signal (NPULSE2) 568 to turn off the M6 transistor. In the meantime, the rising edge of PPULSE 594 also activates the detection circuit 570 to generate a pre-programmed and positively growing pulse at a node (N1) 579. This detects that the P-clamp dynamic period is over and turns on the M5 transistor 552, which starts a charging process with an RC time constant of τdynamic. This action effectively shorts VDD at the PBIAS2 node 530 for the short period of time at the beginning of restoration when it is needed most.

The pulse width is designed based on the delay of an inverter (INV3) 572 and the size of M5 transistor 552. By generating a pre-programmed pulse at the N1 node 579, the M1, M2 and M5 transistors (552, 544, 546) form a dynamic resistor during the N1 pulse on time. As soon as the pre-programmed delay is over, the N1 node 578 returns to a logic zero, the M5 transistor 578 is turned off and the charging process automatically stops. Consequently, the PBIAS2 node 530, and therefore PBIAS node 504, quickly gets restored to the static voltage level of 1.45 volts, which in turn quickly shuts off the M10 P-clamp transistor 506. During the dynamic period, the PBIAS2 node is at 0.5 volts and the M3 transistor 546 is turned off. Consequently, even if the dynamic resistor 550 is momentarily shorted to VDD, there is no short circuit path from VDD 554 to VSS 556.

Figure 6A:
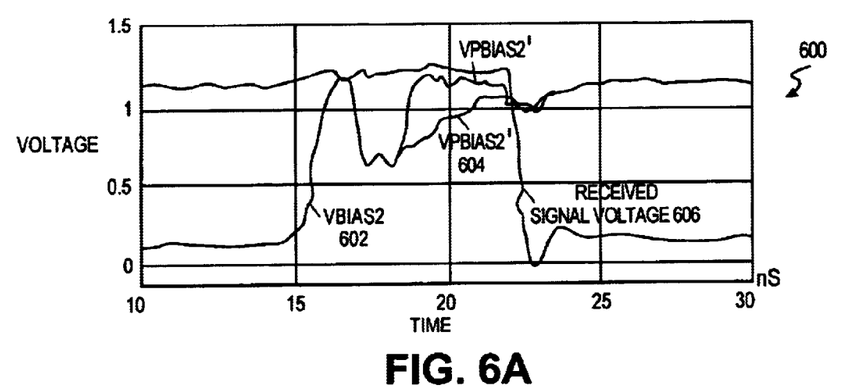
FIG. 6 depicts voltage to time graphs and current to time graphs, illustrating current saved by an I/O buffer utilizing the teachings of the present invention.

Referring now to FIG. 6A, a voltage to time graph 600 is depicted, which illustrates the current saved by the FSB buffer 500 as taught by the present invention. The Vpbias2 voltage level, as described above, is illustrated in the graph 600. Referring to the Vpbias2 signal 602, the Vpbias signal 602 is pulled-down to the dynamic voltage level for a brief period of time and then returned to the Vtt voltage level, as indicated. In contrast, the Vpbias2' signal 604 generated with a conventional I/O buffer is pulled-down to a static voltage level, but then suffers a delay due to an RC time constant, as described above, in returning to the Vtt voltage level. The received signal at a CPU LVGTL buffer is indicated as 606.

Figure 1:
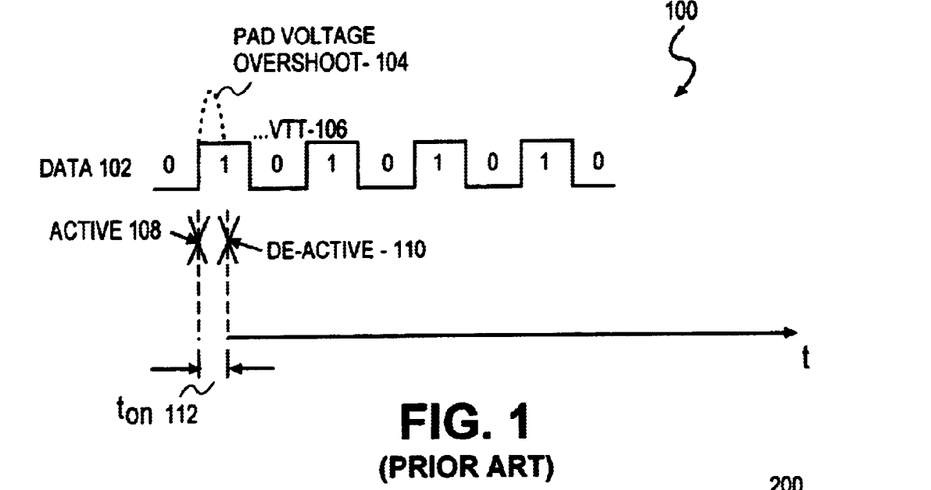
FIG. 1 depicts a voltage to time graph illustrating the problem of pad voltage overshoot, as known in the art.
Figure 6B:
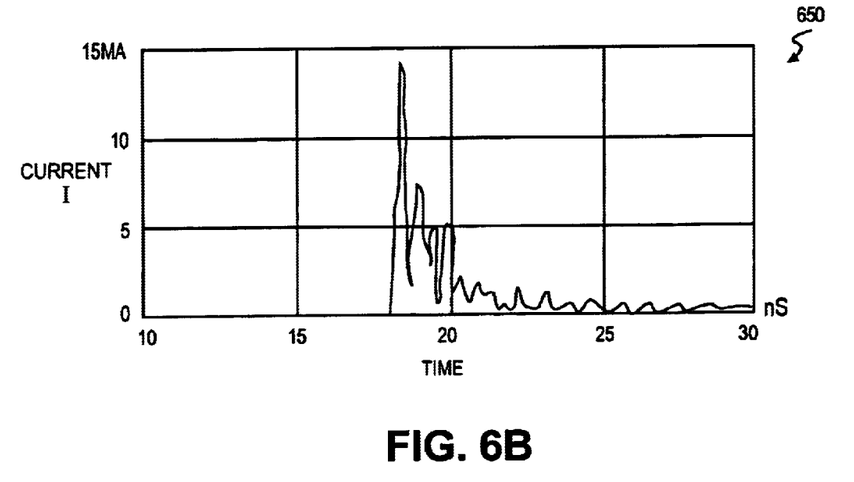

Referring now to FIG. 6B, a current to time graph 650 is illustrated depicting the current saved utilizing an FSB buffer 500, as taught by the present invention. For example, in an FSB buffer 500, as depicted in FIG. 1. The graph 650 is generated with τdynamic equal to 0.4 ns and τstatic equal to 2.4 ns. Based on the graph 650, the current and power consumption saved, using the teachings of the present invention, is 33% per cycle in a typical case. Assuming a system utilizing an FSB buffer, as taught by the present invention, such as computer system 700 (as depicted in FIG. 7) may include as many as 112 FSB buffers. As a result, a total net savings in current of 2.5 mA and a total power savings of 3.5 mW per cycle, assuming a termination voltage Vtt equal to 1.2 volts is achieved. Clearly, the amount of current saved is increased as the number of FSB buffers utilized by the system increases. Such system will achieve an overall reduction of wasted power consumption for the system and the elongation of the battery lifetime.

Referring now to FIG. 7, a computer system 700 is depicted, which utilizes an FSB buffer 500 as taught by the present invention. The computer system includes a chipset 702 having a plurality of FSB buffers 500 (500-1, 500-2, . . . , 500-N), as described with reference to FIG. 5. The computer system 700 also includes a CPU 202 having a plurality of LVGTL FSB buffers 204 (204-1, 204-2, . . . , 204-N). The chipset FSB buffers 500 communicate with the CPU FSB buffers 204 via front side buses 502 (502-1, 502-2, . . . , 502-N).

Figure 8:
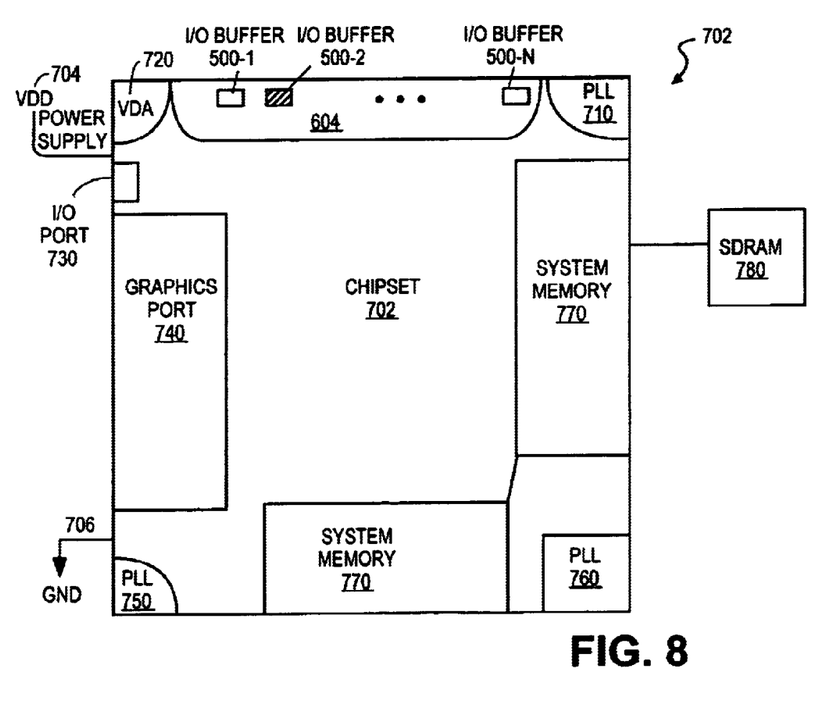
FIG. 8 illustrates a block diagram of an integrated circuit package embodiment of the present invention.

Referring now to FIG. 8, an integrated circuit packet implementing the chipset 702 utilizing FSB buffers 500, as taught by the present invention, is depicted. The chipset may be manufactured to include a plurality of the FSB buffers 500 in order to implement dual mode GTL interface signaling with fast restoration of static bias in order to eliminate wasted power consumption and provide increased battery lifetime. The chipset may include a visual digital-to-analog unit 720, an I/O port 730, a graphics port 740, and phase lock loops (PLL) 710, 750 and 760. The chipset 720 is also manufactured to include a system memory 770, which may interface to a dynamic memory such as SDRAM 780. The chipset 702 is, for example, a graphics memory controller hub as manufactured by the Intel Corporation.

It is to be understood that even though numerous characteristics and advantages of various embodiments of the present invention have been set forth in the foregoing description, together with details of the structure and function of various embodiments of the invention, this disclosure is illustrative only. Changes may be made in detail, especially matters of structure and management of parts within the principles of the present invention to the full extent indicated by the broad general meaning of the terms in which the appended claims are expressed. For example, the particular element may vary depending on the particular application for the novel mixed storage format while maintaining substantially the same functionality without departing from the scope and spirit of the present invention.

In addition, although embodiments described herein are directed to a dual mode GTL interface signaling FSB buffer, it will be appreciated by those skilled in the art that the teaching of the present invention can be applied to other systems. In fact, systems utilizing I/O buffers for implementing LVGTL interface signaling are within the teachings of the present invention, without departing from the scope and spirit of the present invention.

The present invention provides many advantages over known techniques. The present invention includes the ability to conserve battery lifetime by eliminating current wasted by a conducting P-clamp device resulting from a delay in restoration of the PBIAS node from a dynamic voltage level to a static voltage level. By using a dynamic resistor circuit and a self-time pulse, falling edge detection circuit, a P-clamp resistor is forced to return from a dynamic voltage level to a static voltage level in a minimum amount of time. By minimizing this restoration time, all extra current and power consumption caused by conduction of the P-clamp circuit is eliminated. A circuit implemented with the teachings of the present invention, including τdynamic equal to 0.4 ns less than less than τstatic equal to 2.4 ns, the FSB buffer will result in current and power consumption savings of 33% per cycle. A computer system utilizing FSB buffers, as taught by the present invention, including for example, 112 of such FSB buffers, will achieve a total net savings in current of 2.5 mA and a total power savings of 3 mW per cycle, assuming a termination voltage equal to 1.2 volts.

By including the teachings of the present invention, systems designed with the FSB buffers of the present invention will reduce the overall power consumed from the system and elongate the battery lifetime. In addition, this fast restoration from the dynamic voltage level to the static voltage level ensures a correct starting static level when the FSB buffer pad goes from one cycle to the next cycle. Without ensuring that the P-clamp returns to a correct starting static level, the pad will have no trouble rising to the required Vtt voltage level, which could be caused by the P-clamp clamping the pad before it rises to Vtt properly. As a result, a rising signal transition from zero to one at the buffer pad is ensured.

Having disclosed exemplary embodiments and the best mode, modifications and variations may be made to the disclosed embodiments while remaining within the scope of the invention as defined by the following claims.

What is claimed is:

1. A method comprising:
    detecting a rising signal transition at an I/O buffer pad of an I/O buffer;
    clamping a voltage level at the I/O buffer pad to a termination voltage level Vtt, selected according to a mode signal, by pulling down a pbias node voltage from a static voltage level to a dynamic voltage level to prevent the voltage level at the I/O pad from overshooting the Vtt voltage level; and
    once the rising signal transition is complete, generating a dynamic resistance to reduce an RC time constant required to pull up the pbias node voltage from the dynamic voltage level to the static voltage level to reduce power consumption required to clamp the voltage level at the I/O buffer pad to the Vtt voltage level.

2. The method of claim 1, further comprising:
    receiving the mode signal indicating a selected termination voltage level Vtt of the pbias node; and
    supplying the selected termination voltage level Vtt to the pbias node, such that multiple gunning transistor logic signaling is supported by the I/O buffer.

3. The method of claim 1, wherein the detecting the rising signal transition further comprises:
    generating a pulse signal indicating a rising signal transition at the I/O buffer pad; and
    de-asserting the pulse signal once the rising signal transition at the I/O buffer pad is complete.

4. The method of claim 1, wherein the clamping the voltage level at the I/O buffer pad further comprises:
    activating a dynamic circuit, in response to a pulse signal, to pull down the pbias node voltage from the static voltage level to the dynamic voltage level;
    clamping the voltage level at the I/O buffer pad to the Vtt voltage level; and
    de-activating the dynamic circuit in response to de-activation of the pulse signal.

5. The method of claim 4, wherein activating the dynamic bias circuit in response to the pulse signal further comprises:
    causing a p-clamp transistor to conduct to generate a clamping current from an external supply voltage through an external resistor and a ground node resulting in power consumption from the external voltage supply, such that the voltage level at the I/O buffer pad is clamped to the Vtt voltage level during conduction of the p-clamp transistor,
    wherein the p-clamp transistor is de-activated once the pbias node voltage is restored to the static voltage level.

6. The method of claim 5, further comprising:
    generating a pulse signal indicating a rising signal transition at the I/O buffer pad; and de-asserting the pulse signal once the rising signal transition at the I/O buffer pad is complete.

7. The method of claim 1, wherein generating the dynamic resistance t further comprises:

detecting that the rising signal transition is complete in response to a pulse signal indicating a rising signal transition at the I/O buffer pad;

de-activating a dynamic bias circuit in order to begin restoration of the pbias node voltage from the dynamic voltage level to the static voltage level;

activating a dynamic resistance circuit to generate the dynamic resistance to pull-up the pbias node voltage from the dynamic voltage level to the static voltage level; and de-activating the dynamic resistance circuit following a predetermined pulse period of time of a dynamic node pulse.

8. The method of claim 7, further comprising:

generating a pulse signal indicating a rising signal transition at the I/O buffer pad to activate the dynamic bias circuit to pull-down the pbias node voltage to the static voltage level;

de-asserting the pulse signal once the rising signal transition at the I/O buffer pad is complete; and generating the dynamic node pulse for the predetermined pulse period of time in response to the de-assertion of the pulse signal to activate the dynamic resistance circuit.

9. An apparatus, comprising:

a buffer having
a dynamic bias circuit to clamp a voltage level at an I/O buffer pad to a termination voltage level Vtt, selected according to a mode signal, in response to a rising signal transition, by pulling down a pbias node voltage from a static voltage level to a dynamic voltage level, such that the voltage level at the buffer pad is prevented from overshooting the Vtt voltage level;

a static bias circuit to maintain the pbias node voltage at the static voltage level; and a dynamic resistance unit to generate a dynamic resistance to reduce an RC time constant required to pull up the pbias node voltage from the dynamic voltage level to the static voltage level once the rising signal transition is complete to reduce power consumption required to clamp the voltage level at the buffer pad to the Vtt voltage level.

10. The apparatus of claim 9, further comprising:

a mode selection unit to receive the mode signal indicating a selected static voltage level of the pbias node, and to supply the selected static voltage level to the pbias node, such that multiple gunning transistor logic signaling is supported by the I/O buffer.

11. The apparatus of claim 10, wherein mode selection unit comprises:

a first mode transistor having a source coupled to a first termination voltage level Vtt, a drain coupled to the pbias node, and a gate coupled to the mode signal;

a second mode transistor having a source coupled to a second termination voltage level Vtt, a drain coupled to the pbias node, and a gate coupled to an inverted mode signal, wherein when the mode signal activates first mode transistor, the first Vtt voltage is provided to a gate of a p-clamp transistor for clamping the buffer pad based on the first Vtt voltage level, and when the inverted mode signal activates second mode transistor, the second Vtt node voltage is provided to the gate of p-clamp transistor for clamping the buffer pad based on the second Vtt voltage level.

12. The apparatus of claim 9, wherein the dynamic bias circuit comprises:

a first dynamic transistor having a source coupled to the pbias node and a gate coupled to an inverted pulse signal to activate the first dynamic transistor as a switch; and a second dynamic transistor having a source and a gate coupled to a drain of the first dynamic transistor in a diode configuration, and a drain coupled to an internal ground, such that when first dynamic transistor is activated by the inverted pulse signal, the pbias node voltage is discharged through the first and second dynamic transistors and drops from the static voltage level and clamped to the dynamic voltage level by the second dynamic transistor.

13. The apparatus of claim 9, wherein the static bias circuit comprises:

a first static transistor having a source coupled to a part core power supply Vdd and a gate coupled to an internal ground;

a second static transistor having a source coupled to a drain of the first static transistor and a gate and a drain coupled to the pbias node in a diode configuration;

a third static transistor having a source coupled to the pbias node and a gate coupled to a bias voltage to bias the third static transistor in a saturation region to maintain a constant current through the first and second static transistors; and a fourth static transistor having a source coupled to a drain of the third static transistor, a drain coupled to an internal ground and a gate coupled to a buffer enable signal, such that the fourth static transistor functions a switch for enabling the static bias circuit in response to the enable signal.

14. The apparatus of claim 9, wherein the dynamic resistance circuit comprises:

a first dynamic resistance transistor having a source coupled to a part core power supply Vdd and a gate coupled to an internal ground;

a second dynamic resistance transistor having a source coupled to a drain of the first static transistor and a gate and a drain coupled to the pbias node in a diode configuration; and a third dynamic resistance transistor having a source coupled to Vdd, a drain coupled the pbias node and a gate coupled to an inverted and delayed pulse signal, such that when the inverted and delayed pulse signal activates the third dynamic resistance transistor, the pbias node voltage is charged by the first, second and third dynamic resistance transistors from the dynamic voltage level to the static voltage level.

15. The apparatus of claim 14, wherein the dynamic resistance circuit further comprises:

a self-timed pulse circuit having
a first logic unit to receive a buffered and inverted version of a pulse signal as a first input and the pulse signal as a second input and generate a logical NAND operation of the first and second inputs to generate a first output; and an inverted to received the first output and buffer and invert the first output to generate the inverted and delayed pulse signal for a pre-determined period of time, such that the third dynamic resistance transistor is active for the pre-determined period of time, during which time the dynamic resistance unit is inactive, to prevent contention between the dynamic resistance circuit and the dynamic bias circuit.

16. The apparatus of claim 9, further comprising:
an external transistor coupled between an external power supply and an I/O buffer ground; and
a p-clamp transistor having a gate coupled to the pbias node, a drain coupled to an external ground, and a source coupled to the buffer pad, such that when the pbias node voltage level drops to the dynamic voltage level, the p-clamp transistor conduct to generate a clamping current from the external supply voltage through an external resistor and a ground node to consume power from the external voltage supply to clamp the voltage level at the I/O buffer pad to the Vtt voltage level during conduction of the p-clamp transistor,
wherein the p-clamp transistor is de-activated once the pbias node voltage is restored to the static voltage level.

17. The apparatus of claim 12, wherein the dynamic bias circuit further comprises:
a pulse circuit having
a first logic unit to receive a pulse signal as a first input and an inverted mode signal as a second input to generate a logical NAND operation of the first and second inputs to generate the inverted and delayed pulse signal.

18. The apparatus of claim 9, further comprising:
very large scale integration (VLSI) logic built on a same die as the I/O buffer and coupled to generate and feed the PPULSE signal, an enable signal and a data signal.

19. The apparatus of claim 18, further comprising:
an integrated circuit package containing the die in which the VLSI logic, the I/O buffer, and the I/O buffer pad are built, the I/O buffer pad coupled to an external terminal of the package.

20. A system comprising:
a front side bus coupling a processor to chipset via a chipset front side bus;
a plurality of front side bus buffers including:
a dynamic bias circuit to clamp a voltage level at a buffer pad to a termination voltage level Vtt, selected according to a mode signal, in response to a rising signal transition, by pulling down a pbias node voltage from a static voltage level to a dynamic voltage level, such that the voltage level at the buffer pad is prevented from overshooting the Vtt voltage level;
a static bias circuit to maintain the pbias node voltage at the static voltage level; and
a dynamic resistance unit to generate a dynamic resistance to reduce an RC time constant required to pull up the pbias node voltage from the dynamic voltage level to the static voltage level once the rising signal transition is complete to reduce power consumption required to clamp the voltage level at the buffer pad to the Vtt voltage level.

21. The system of claim 20, further comprising:
a mode selection unit to receive the mode signal indicating a selected static voltage level of the pbias node, and supply the selected static voltage level to the pbias node, such that multiple gunning transistor logic signaling is supported by the buffer.

22. The system of claim 21, wherein mode selection unit comprises:
a first mode transistor having a source coupled to a first termination voltage level Vtt, a drain coupled to the pbias node, and a gate coupled to the mode signal;
a second mode transistor having a source coupled to a second termination voltage level Vtt, a drain coupled to the pbias node, and a gate coupled to an inverted mode signal,
wherein when the mode signal activates first mode transistor, the first Vtt voltage is provided to a gate of a p-clamp transistor for clamping the buffer pad based on the first Vtt voltage level, and when the inverted mode signal activates second mode transistor, the second Vtt node voltage is provided to the gate of p-clamp transistor for clamping the buffer pad based on the second Vtt voltage level.

23. The system of claim 20, wherein the dynamic bias circuit comprises:
a first dynamic transistor having a source coupled to the pbias node and a gate coupled to an inverted pulse signal to activate the first dynamic transistor as a switch; and
a second dynamic transistor having a source and a gate coupled to a drain of the first dynamic transistor in a diode configuration, and a drain coupled to an internal ground, such that when first dynamic transistor is activated by the inverted pulse signal, the pbias node voltage is discharged through the first and second dynamic transistors and drops from the static voltage level and clamped to the dynamic voltage level by the second dynamic transistor.

24. The system of claim 20, wherein the static bias circuit comprises:
a first static transistor having a source coupled to a part core power supply Vdd and a gate coupled to an internal ground;
a second static transistor having a source coupled to a drain of the first static transistor and a gate and a drain coupled to the pbias node in a diode configuration;
a third static transistor having a source coupled to the pbias node and a gate coupled to a bias voltage to bias the third static transistor in a saturation region to maintain a constant current through the first and second static transistors; and
a fourth static transistor having a source coupled to a drain of the third static transistor, a drain coupled to an internal ground and a gate coupled to an I/O buffer enable signal, such that the fourth static transistor functions a switch for enabling the static bias circuit in response to the enable signal.

25. The system of claim 20, wherein the dynamic resistance circuit comprises:
a first dynamic resistance transistor having a source coupled to a part core power supply Vdd and a gate coupled to an internal ground;
a second dynamic resistance transistor having a source coupled to a drain of the first static transistor and a gate and a drain coupled to the pbias node in a diode configuration; and
a third dynamic resistance transistor having a source coupled to Vdd, a drain coupled the pbias node and a gate coupled to an inverted and delayed pulse signal, such that when the inverted and delayed pulse signal activates the third dynamic resistance transistor, the pbias node voltage is charged by the first, second and third dynamic resistance transistor from the dynamic voltage level to the static voltage level.

26. The system of claim 25, wherein the dynamic resistance circuit further comprises:
   a self-timed pulse circuit having
      a first logic unit to receive a buffered and inverted version of a pulse signal as a first input and the pulse signal as a second input and generate a logical NAND operation of the first and second inputs to generate a first output; and
   an inverted to received the first output and buffer and invert the first output to generate the inverted and delayed pulse signal for a pre-determined period of time, such that the third dynamic resistance transistor is active for the pre-determined period of time, during which time the dynamic resistance unit is inactive, to prevent contention between the dynamic resistance circuit and the dynamic bias circuit.

27. The system of claim 20, further comprising:
   an external transistor coupled between an external power supply a pulse circuit having
   a first logic unit to receive a pulse signal as a first input and an inverted mode signal as a second input to generate a logical NAND operation of the first and second inputs to generate the inverted and delayed pulse signal and an I/O buffer ground; and
   a p-clamp transistor having a gate coupled to the pbias node, a drain coupled to an external ground, and a source coupled to the buffer pad, such that when the pbias node voltage level drops to the dynamic voltage level, the p-clamp transistor begins conducting and generates a clamping current from the external supply voltage through an external resistor and a ground node to consume power from the external voltage supply to clamp the voltage level at the I/O buffer pad to the Vtt voltage level during conduction of the p-clamp transistor,
   wherein the p-clamp transistor is de-activated once the pbias node voltage is restored to the static voltage level.

28. The system of claim 20, wherein the dynamic bias circuit comprises:
   a pulse circuit having
      a first logic unit to receive a pulse signal as a first input and an inverted mode signal as a second input to generate a logical NAND operation of the first and second inputs to generate the inverted and delayed pulse signal.

29. The system of claim 20, further comprising:
   very large scale integration (VLSI) logic built on a same die as the I/O buffer and coupled to generate and feed the PPULSE signal, an enable signal and a data signal.

30. The system of claim 29, further comprising:
   an integrated circuit package containing the die in which the VLSI logic, the I/O buffer, and the buffer pad are built, the buffer pad coupled to an external terminal of the package.

31. A dual mode GTL interface signaling buffer comprising:
   a dynamic bias circuit to clamp a voltage level at an I/O buffer pad to a termination voltage level Vtt, in response to a rising signal transition, by pulling down a pbias node voltage from a static voltage level to a dynamic voltage level, such that the voltage level at the buffer pad is prevented from overshooting the Vtt voltage level;
   a static bias circuit to maintain the pbias node voltage at the static voltage level; and a dynamic resistance unit to generate a dynamic resistance to reduce an RC time constant required to pull up the pbias node voltage from the dynamic voltage level to the static voltage level once the rising signal transition is complete to reduce power consumption required to clamp the voltage level at the buffer pad to the Vtt voltage level; and
   a mode selection unit to receive a mode signal indicating a selected static voltage level of the pbias node, and to supply the selected static voltage level to the pbias node.

32. The buffer of claim 31, wherein the dynamic resistance circuit comprises:
   a first dynamic resistance transistor having a source coupled to a part core power supply Vdd and a gate coupled to an internal ground;
   a second dynamic resistance transistor having a source coupled to a drain of the first static transistor and a gate and a drain coupled to the pbias node in a diode configuration; and
   a third dynamic resistance transistor having a source coupled to Vdd, a drain coupled the pbias node and a gate coupled to an inverted and delayed pulse signal, such that when the inverted and delayed pulse signal activates the third dynamic resistance transistor, the pbias node voltage is charged by the first, second and third dynamic resistance transistors from the dynamic voltage level to the static voltage level.

33. The buffer of claim 31, wherein the dynamic resistance circuit comprises:
   a self-timed pulse circuit having
      a first logic unit to receive a buffered and inverted version of a pulse signal as a first input and the pulse signal as a second input and generate a logical NAND operation of the first and second inputs to generate a first output; and
   an inverted to received the first output and buffer and invert the first output to generate the inverted and delayed pulse signal for a pre-determined period of time, such that the third dynamic resistance transistor is active for the pre-determined period of time, during which time the dynamic resistance unit is inactive, to prevent contention between the dynamic resistance circuit and the dynamic bias circuit.

34. The buffer of claim 31, further comprising:
   very large scale integration (VLSI) logic built on a same die as the I/O buffer and coupled to generate and feed the PPULSE signal, an enable signal and a data signal.

35. The buffer of claim 34, further comprising:
   an integrated circuit package containing the die in which the VLSI logic, the I/O buffer, and the I/O buffer pad are built, the I/O buffer pad coupled to an external terminal of the package.

36. The buffer of claim 31, wherein the mode selection unit comprises:
   a first mode transistor having a source coupled to a first termination voltage level Vtt, a drain coupled to the pbias node, and a gate coupled to the mode signal;
   a second mode transistor having a source coupled to a second termination voltage level Vtt, a drain coupled to the pbias node, and a gate coupled to an inverted mode signal,
   wherein when the mode signal activates first mode transistor, the first Vtt voltage is provided to a gate of a p-clamp transistor for clamping the buffer pad based on the first Vtt voltage level, and when the inverted mode signal activates second mode transistor, the second Vtt node voltage is provided to the gate of p-clamp transistor for clamping the buffer pad based on the second Vtt voltage level.

* * * * *